United States Patent [19]

Binz et al.

[11] Patent Number: 4,482,995
[45] Date of Patent: Nov. 13, 1984

[54] TIME DIVISION MULTIPLEX SWITCHING NETWORK UNIT

[75] Inventors: Reiner Binz, Hohenschaeftlarn; Eberhard Knorpp, Gauting; Frithjof von Sichart, Munich, all of Fed. Rep. of Germany

[73] Assignee: Siemens Aktiengesellschaft, Berlin & Munich, Fed. Rep. of Germany

[21] Appl. No.: 345,596

[22] Filed: Feb. 4, 1982

[30] Foreign Application Priority Data

Mar. 13, 1981 [DE] Fed. Rep. of Germany ....... 3109767

[51] Int. Cl.³ .............................................. H04J 3/00
[52] U.S. Cl. ......................................... 370/59; 370/61
[58] Field of Search ...................... 370/58, 59, 61, 66, 370/68

[56] References Cited

U.S. PATENT DOCUMENTS

| | | | |
|---|---|---|---|
| 4,071,701 | 1/1978 | Leijonhufvud et al. | 370/66 |
| 4,131,763 | 12/1978 | Herschtal | 370/66 |
| 4,320,501 | 3/1982 | Le Dieu et al. | 370/63 |
| 4,386,425 | 5/1983 | Belforte et al. | 370/66 |

Primary Examiner—Douglas W. Olms
Assistant Examiner—Frank M. Scutch, III
Attorney, Agent, or Firm—Hill, Van Santen, Steadman & Simpson

[57] ABSTRACT

In a time-division multiplex switching network unit for time-space switching which operates employing an information memory which has information input thereto in a cyclic manner and read therefrom in a random fashion, the number of terminals is limited, in particular, by the fact that during random output it is not possible to exceed a specific speed. Higher number of terminals are achieved in that the switching network units are composed of modules whose corresponding inputs are connected to one another and into which, during each pulse frame, more PCM words are input than are output. In this manner, the reading frequency is kept low, although, because of the multiple connection at the input end, blocking-free switch-through is provided.

5 Claims, 4 Drawing Figures

TIME DIVISION MULTIPLEX SWITCHING NETWORK UNIT

CROSS REFERENCE TO RELATED APPLICATION

This application is related to an application, Ser. No. 345,595, filed 2/4/1982 now U.S. Pat. No. 4,455,648 issued 6/19/84.

BACKGROUND OF THE INVENTION

1. Field of the Invention

The present invention relates to a time division multiplex (TDM) switching network unit for the connection of a plurality of pulse code modulation (PCM) lines, which implements a time-wise assignment and a spatial assignment of time channels used on PCM lines for the incoming direction of transmission to time channels used on PCM lines for the outgoing direction of transmission by virtue of a cyclic input of the incoming PCM words into the storage cells of its data memory, and by correspondingly delayed random reading of the outgoing PCM words from the storage cells.

2. Description of the Prior Art

In known switching networks which are constructed from switching network units of this kind (e.g. "International Zurich Seminar", 1972, B4 (1) to B4 (5)), the switching network units which are used possess an equal number of inputs and outputs, and therefore as many PCM lines for the incoming direction of transmission are connected as PCM lines for the outgoing direction of transmission.

If the number of PCM lines to be connected to a switching network exceeds the number of inputs and outputs of such switching network units, it is either possible to construct a multi-stage switching network from switching network units of this kind, or else the switching network can be formed from a plurality of single-stage switching network units, each of which comprise as many switching units as switching network components, in which case the incoming TDM lines which are connected to the switching network units are also each connected to a corresponding input of the switching network unit of every other switching network component, and equivalent outputs of these switching units within the individual switching network components are connected to one another and to an outgoing TDM line (see "Commutation & Electronique", No. 40, January 1973, Page 14–40).

The multi-stage switching network construction requires an increase in the transit times during the connection of inputs and outputs and, if the number of stages is even, an oblique load sensitivity. Although these disadvantages do not exist in the aforementioned single-stage switching network versions, instead a multiplication of the connection possibilities leads to a quadratic increase in the required switching network units.

An increase in the number of PCM lines connected to a single TDM switching network unit, in particular when these units are to be constructed in integrated circuitry, is restricted, on the one hand, by technological aspects and, on the other hand, by the clock pulse speeds required for input and output.

SUMMARY OF THE INVENTION

The object of the invention, therefore, is to provide a TDM switching unit which, regardless of the last-mentioned restrictions, permits the connection of a larger number of input and output lines and thus provides more favorable conditions for the construction of switching networks having larger numbers of terminals.

This object is realized in a TDM switching unit of the type generally set forth above, and according to the present invention, in that the unit comprises a plurality, preferably two, of identical switching network modules, which include inputs for the connection of PCM lines for the incoming direction of transmission in this number and/or for the transmission of PCM information with this bit clock pulse frequency, and further each include an information memory of corresponding capacity. In respect of each pulse frame, PCM words can be input and stored in a number which is a multiple—equal to the aforementioned number—of the number of PCM words which, during one pulse frame, can be read on the PCM lines for the outgoing direction of transmission which are connected to the outputs. Equivalent inputs of these switching network modules are, in each case, connected to one another.

The invention is based on the recognition that the limits for the clock pulse frequency during the operation of such TDM switching network units which, as stated, are reached relatively rapidly, in particular in an integrated circuitry construction, are greater in the case of the cyclic input of PCM words into the information memory of such units than at the time of the random access reading from such an information memory. Therefore, this means that the TDM switching network unit constructed in accordance with the present invention represents a favorable solution, not only in respect of the technological problems of the production of an integrated module which comprises, for example, in the restriction of the number of outgoing terminals, but also in respect of the aforementioned clock pulse frequencies.

In comparison to the use of switching network units in which the limit of the number of terminals is lower, for the above-described reasons, a TDM switching network constructed employing TDM switching network units will require smaller number of stages up to larger number of terminals if a multi-stage arrangement is selected, and will require a lower expense if the above-mentioned single-stage version is selected.

BRIEF DESCRIPTION OF THE DRAWINGS

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
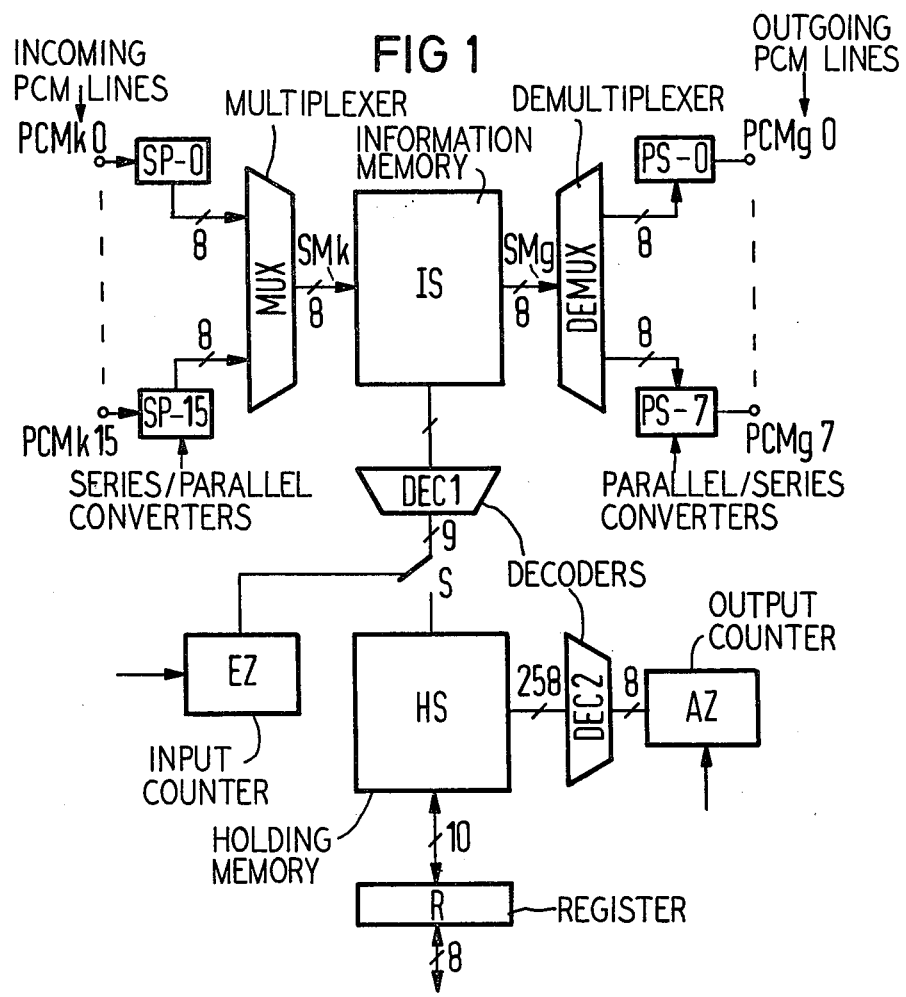
FIG. 1 is a block circuit diagram of a module such as may be employed to construct the TDM switching unit of the present invention.

Referring to FIG. 1, 16 incoming PCM lines PCMk0–PCMk15, and 8 outgoing PCM lines PCMg0–PCMg7 are connected to a switching-network module. The access to the incoming PCM lines takes place via line-individual series/parallel converters SP0–SP15 by which the bits of the PCM words, which occur in serial fashion of the PCM lines, are converted into parallel form. Accordingly, the series/parallel converters each include 8 output lines.

These output lines are connected to a multiplexer MUX which combines the PCM words which occur in parallel form on a super-multiplex line SMk, which likewise includes 8 line wires.

The super-multiplex line SMk is connected to an information memory IS, also called a speech memory, which includes as many storage cells, each for one PCM word, as PCM words can be supplied during a pulse frame via the incoming PCM lines. In the illustrated exemplary embodiment of the invention in which 16 incoming PCM lines are connected, each of which is to be assigned to a PCM basic system 30/32, the number of storage cells amounts to 512, each comprising 8 bits, so that the total storage requirement is for 4096 bits.

The input of the PCM words arriving on the PCM lines PCMk0–PCMk15 into the information memory is effected cyclically, for which purpose an input counter EZ supplies the appropriate drive addresses for the information storage cells via a decoder DEC1.

As stated above, the reading of the PCM words from the information memory IS takes place with random access. The appropriate drive addresses are supplied by a holding memory HS which in the present example contains 256 storage cells for drive addresses, which each comprise 9 bits and one parity bit. The storage cells of the holding memory HS are cyclically operated by an output counter AZ via a decoder DEC2. They each emit 256 drive addresses in respect of each pulse frame via a switch S and the aforementioned decoder DEC1.

The PCM words read from the speech memory IS are fed on a super-multiplex line SMg for the outgoing direction of transmission to a demultiplexer DEMUX from which, depending upon their position in time, they are transmitted via groups of lines, each comprising 8 lines, to parallel/series converters PS0–PS7 whose series outputs are connected to the aforementioned PCM lines for the outgoing direction of transmission PCMg0–PCMg7.

It will be clear from the above that, because of the cyclic input, twice as many PCM words are input into the memory IS are withdrawn from the memory at the time of reading. An increase in the frequency at the time of the random reading would no longer safely lead to fall-free operation.

For the sake of clarity, the register R will be described which represents a further component of FIG. 1 and which comprises an interface to a control unit, for example in the form of a μ-processor from which, during the establishment of new connections, appropriate information memory addresses are input into the holding memory.

Figure 2:
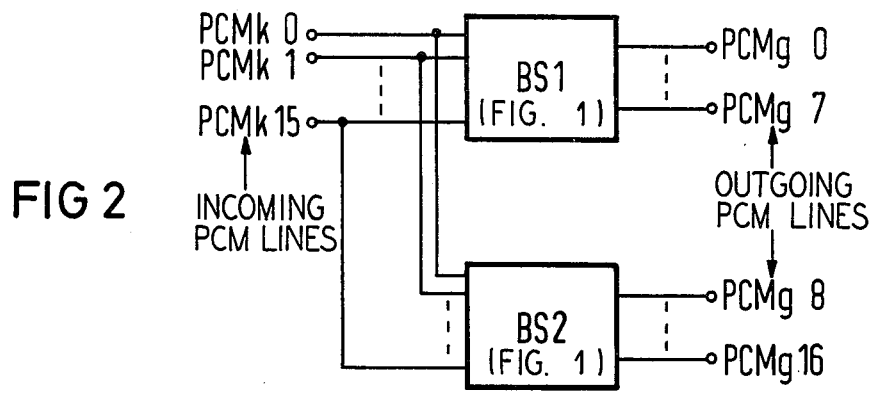
FIG. 2 is a simplified block diagram of a TDM switching network unit constructed in accordance with the present invention.

FIG. 2 illustrates how, employing a plurality of switching network modules of the type illustrated in FIG. 1, it is possible to construct a switching network unit in accordance with the present invention. If it is assumed that the number of PCM words input during each pulse frame is twice the number of random output PCM words, which forms the basis of the description of the exemplary embodiment illustrated in FIG. 1, then two such switching network modules BS1 and BS2 are combined to form one switching network unit. If the ratio of input to output PCM words were 3:1, three switching network modules would be needed. However, an increase in the aforementioned ratio and in the number of switching network modules is restricted for reasons of expense. As shown in FIG. 2, the equivalent inputs of the two modules BS1 and BS2 of the switching network unit are connected to one another. In the event that modules corresponding to FIG. 1 are used, a switching network unit of this kind, as shown in FIG. 2, possesses 16 inputs for the connection of 16 incoming PCM lines PCMk0–PCMk15, and likewise 16 outputs for the connection of outgoing PCM lines PCMg0–PCMg15. During the operation of a TDM switching network unit of this kind, all of the PCM words supplied on the 16 incoming PCM lines are input both into the information memory of the switching network unit BS1 and into the information memory of the switching network unit BS2, but in each of the individual switching network units only PCM words which are output from these information memories are those which are to be further transmitted on one of the PCM lines for the outgoing direction of transmission which are connected to the switching network module in question. Therefore, the switching network unit illustrated in FIG. 2 represents a blocking-free switching network.

In contrast to the described conditions in which it has been assumed that the switching network modules or switching network unit is/are connected to PCM lines which extend in PCM basic systems, and, therefore, in the case of a PCM system 30/32, a bit pulse train frequency of 2.048 MHz has been assumed, it is also possible to connect PCM lines which run in PCM super-systems in which the bit clock pulse frequency is appropriately higher. In this case, it is merely necessary to ensure that the number of PCM words input during each pulse frame from the incoming PCM lines does not exceed the number 512 and that no more than 256 PCM words must be read from each of the information memories during each pulse frame.

Figure 3:
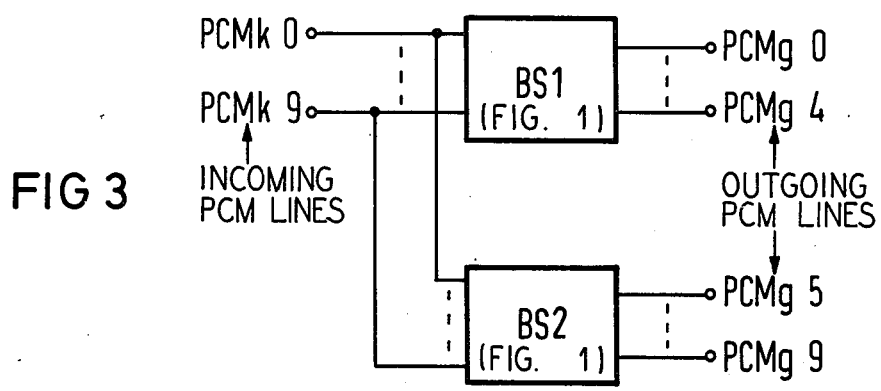
FIGS. 3 and 4 illustrate connection variations of the switching network unit illustrated in FIG. 2.
Figure 4:
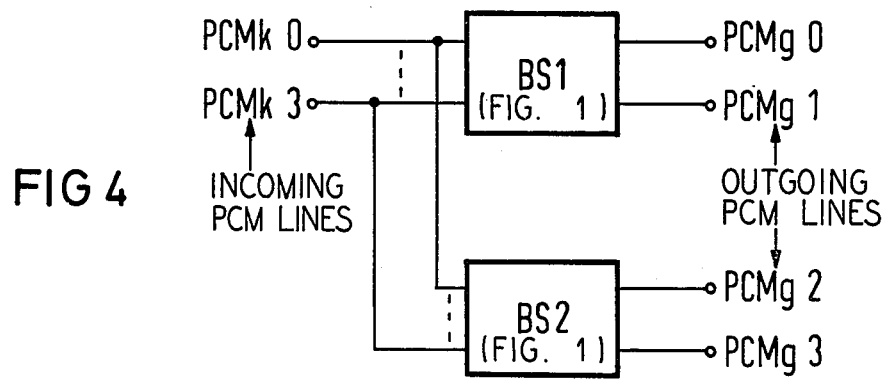

As can be seen from FIGS. 3 and 4, this results in different possible combinations.

Therefore, in accordance with FIG. 3, the TDM switching network, in accordance with the invention, is connected to 8 incoming PCM lines PCMk0–PCMk7, on which 2.048 Mbit/s are transmitted, and to 2 incoming PCM lines PCMk8 and PCMk9 on which 8.192 Mbit/s occur. The outputs of each of the switching network modules BS1 and BS2 are connected to 4 outgoing PCM lines PCMg0–PCMg3 and PCMg5–PCMg8 on which 2.048 Mbit/s are transmitted and to a PCM line PCMg4 and PCMg9 on which 8.192 Mbit/s occur.

In the exemplary embodiment illustrated in FIG. 4, at the input are connected 4 PCM lines PCMk0–PCMk3 which extend in PCM super-systems having a transmission frequency of 8.192 Mbit/s, whereas at the output end there are connected in each case, 2 PCM lines, PCMg0–PCMg3, for PCM super-systems with a transmission frequency of 8.192 Mbit/s.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A time division multiplex switching network unit for the connection of a plurality of pulse code modulation lines which produces a time-wise assignment and a spatial assignment of time channels used on incoming pulse code modulation lines by the cyclic storage of information and by correspondingly delayed reading of outgoing pulse code modulation words, comprising: a plurality of identical switching network modules each comprising an information memory including storage cells, for receiving, storing and emitting pulse code modulated words, a plurality of inputs for connection to the incoming pulse code modulation lines, each of said inputs connected to the corresponding inputs of each other module, input means, including series/parallel conversion means connected to said incoming pulse code modulation lines and multiplexing means connected between said series/parallel conversion means and said information memory, a plurality of outputs for connection to the outgoing pulse code modulation lines, output means, including demultiplexing means connected to said information memory and parallel/series conversion means connected between said demultiplexing means and said plurality of outputs, and control means connected to said information memory for controlling cyclic storage and random access reading of pulse code modulated words and operable during each pulse frame to control the storage of a first predetermined number of pulse code modulated words which is a multiple of a second predetermined number of pulse code modulated words which can be read during a pulse frame.

2. The time division multiplex switching network unit of claim 1, comprising:

two identical switching network modules.

3. The time division multiplex switching network unit of claim 1, wherein:

said plurality of inputs for connection to incoming pulse code modulation lines is equal to said plurality of outputs for connection to outgoing pulse code modulation lines.

4. The time division multiplex switching network unit of claim 1, wherein:

means are provided for causing outgoing transmission at the same bit tansmission frequency as information transmission on the incoming pulse code modulation lines.

5. The time division multiplex switching network unit of claim 1, wherein:

means are provided for causing a bit transmission frequency for outgoing transmission differing in integral ratio from the bit transmission frequency on the incoming pulse code modulation lines.

* * * * *